(12) United States Patent
Silva et al.

(10) Patent No.: US 8,567,582 B2
(45) Date of Patent: Oct. 29, 2013

(54) SYNCHRONIZER ASSEMBLY

(75) Inventors: Renato Freitas Silva, Santo André (BR); Edmar Jose Pereira Gomes, San Jose dos Campos (BR); Sergio R. Marin, Maua (BR); Leandro V. Alencar, Maua (BR)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

(21) Appl. No.: 12/967,812

(22) Filed: Dec. 14, 2010

(65) Prior Publication Data
US 2012/0145507 A1    Jun. 14, 2012

(51) Int. Cl.
*F16D 23/06*    (2006.01)

(52) U.S. Cl.
USPC .......................................... 192/53.3; 74/339

(58) Field of Classification Search
USPC ......... 192/53.35, 53.3, 53.36, 53.361, 53.364
See application file for complete search history.

(56) References Cited

U.S. PATENT DOCUMENTS

| | | | |
|---|---|---|---|
| 1,997,056 A * | 4/1935 | Griswold | 192/53.35 |
| 3,419,121 A | 12/1968 | Stott | |
| 4,176,736 A * | 12/1979 | Richards et al. | 192/53.35 |
| 4,445,602 A | 5/1984 | Chana | |
| 4,782,929 A * | 11/1988 | Muller | 192/53.35 |
| 4,809,832 A | 3/1989 | Inui | |
| 4,852,709 A * | 8/1989 | Fukuhara et al. | 192/53.35 |
| 5,769,198 A | 6/1998 | Gluys et al. | |
| 6,102,180 A | 8/2000 | Gluys et al. | |

FOREIGN PATENT DOCUMENTS

| | | |
|---|---|---|
| DE | 19755613 A1 | 6/1999 |
| DE | 102009007848 A1 | 8/2010 |
| EP | 0933547 | 8/1999 |
| FR | 2390633 A1 | 12/1978 |
| FR | 2783294 A1 | 3/2000 |
| JP | 8200397 A | 8/1996 |

* cited by examiner

*Primary Examiner* — David D Le
*Assistant Examiner* — Stacey Fluhart

(57) ABSTRACT

A synchronizer assembly includes a synchronizer sleeve that engages a first gearwheel of the transmission. The synchronizer sleeve and the first gearwheel are rotatable about a shaft, and the synchronizer sleeve is axially moveable along the shaft. The synchronizer assembly further includes a synchronizer ring that contacts a second gearwheel of the transmission to selectively engage the synchronizer sleeve. The synchronizer ring includes a synchronizer spring that selectively abuts the second gearwheel to push the synchronizer ring against the synchronizer sleeve, and a plurality of lugs that engage the second gearwheel. The synchronizer spring is retained on the plurality of lugs.

14 Claims, 7 Drawing Sheets

SYNCHRONIZER ASSEMBLY

FIELD

The present disclosure relates generally to a synchronizer for a transmission. More specifically, the disclosure relates to a synchronizer for a reverse gearwheel of the transmission.

BACKGROUND

The statements in this section merely provide background information related to the present disclosure and may not constitute prior art.

In a conventional motor vehicle powertrain, a gear transmission is employed for transferring torque of a combustion engine to the drive wheels of the vehicle. The transmission includes an input shaft that connects to the engine via a clutch and an output shaft that connects to the drive wheels. The input shaft carries input gearwheels that are mounted to the input shaft. Similarly, the output shaft carries output gearwheels that are rotatable about the output shaft. The input gearwheels mesh or comb with the output gearwheels to transfer the engine torque to the drive wheels of the vehicle. The output shaft also carries synchronizers that enable the transmission to provide various gear ratios and, hence, different torque paths.

The various components of a convention transmission, however, require significant amount of space. Accordingly, it is desirable for a transmission and, in particular, a synchronizer assembly that requires less space.

SUMMARY

The present invention provides a synchronizer assembly for a transmission in a motor vehicle powertrain.

In general, the synchronizer assembly includes a synchronizer sleeve that engages a first gearwheel of the transmission. The synchronizer sleeve and the first gearwheel are rotatable about a shaft, and the synchronizer sleeve is axially moveable along the shaft. The synchronizer assembly further includes a synchronizer ring that contacts a second gearwheel of the transmission to selectively engage the synchronizer sleeve. The synchronizer ring includes a synchronizer spring that selectively abuts the second gearwheel to push the synchronizer ring against the synchronizer sleeve, and a plurality of lugs that engage the second gearwheel. The synchronizer spring is retained on the plurality of lugs.

The synchronizer assembly has a small amount of travel with a short actuation movement. The synchronizer can be implemented in a reverse gearwheel for the transmission, since the synchronizer has an advantage of occupying a small space that is suitable for use with the reverse gear.

In certain implementations, the synchronizer spring is an annular spring that exerts a pre-synchronization force on the second gearwheel, and the second gearwheel is employed for selectively interlocking with the first gearwheel through the synchronizer assembly. In particular implementations, the synchronizer sleeve includes a plurality of splines for engaging with the first gearwheel, and the second gearwheel includes a plurality of splines for interlocking with splines of the first gearwheel via the synchronizer sleeve. Such an assembly works reliably, takes up little space, is easy to mount, and has a short travel.

Splines of the second gearwheel may include projections for interaction with the synchronizer spring of the synchronizer assembly. These projections push against the synchronizer sleeve to urge the synchronizer ring of the synchronizer assembly against the synchronizer sleeve.

The synchronizer spring enables the synchronizer assembly to provide smooth and quiet shifting. The second gearwheel can also include a retainer groove for interacting with the synchronizer spring to provide a defined shift feedback to a human operator, both for full locking and also for unlocking of a shifting mechanism associated with the synchronizer assembly. In addition, the groove provides against unwanted unlocking of the second gearwheel from the first gearwheel.

The plurality of lugs can provide for engaging and for disengaging the second gearwheel. In certain implementations, the synchronizer ring includes three lugs to provide a symmetric design that is reliable and has a construction that minimizes space. The spring element may be is made from a wire.

The synchronizer ring may include pre-synchronizing projections on its inner surface for contacting corresponding splines of the second gearwheel. This enables easy alignment and engagement between the first and the second gearwheel. The synchronizer ring may include a ring frictional member that selectively engages with a sleeve frictional member of the synchronizer sleeve to provide synchronization between the synchronizer ring and the synchronizer sleeve. The synchronizer assembly may include a retainer section that retains the synchronizer ring on the synchronizer sleeve, which is helpful for unlocking operations when the synchronizer sleeve pulls the synchronizer ring away from the second gearwheel. The retainer may include a ring section on the synchronizer sleeve. The ring section can be a metal part that is fixed on the synchronizer sleeve. Such an arrangement is easy to manufacture by simple cutting, stamping and bending, or rolling operations from a sheet of metal.

The synchronizer assembly may be implemented in a shifting mechanism for a transmission, and the transmission can be connected to an engine of a vehicle with an input shaft.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating principles of the invention. Moreover, like reference characters designate corresponding parts throughout the different views. In the drawings.

DETAILED DESCRIPTION

The following description is merely exemplary in nature and is not intended to limit the present disclosure, application, or uses.

Figure 1:
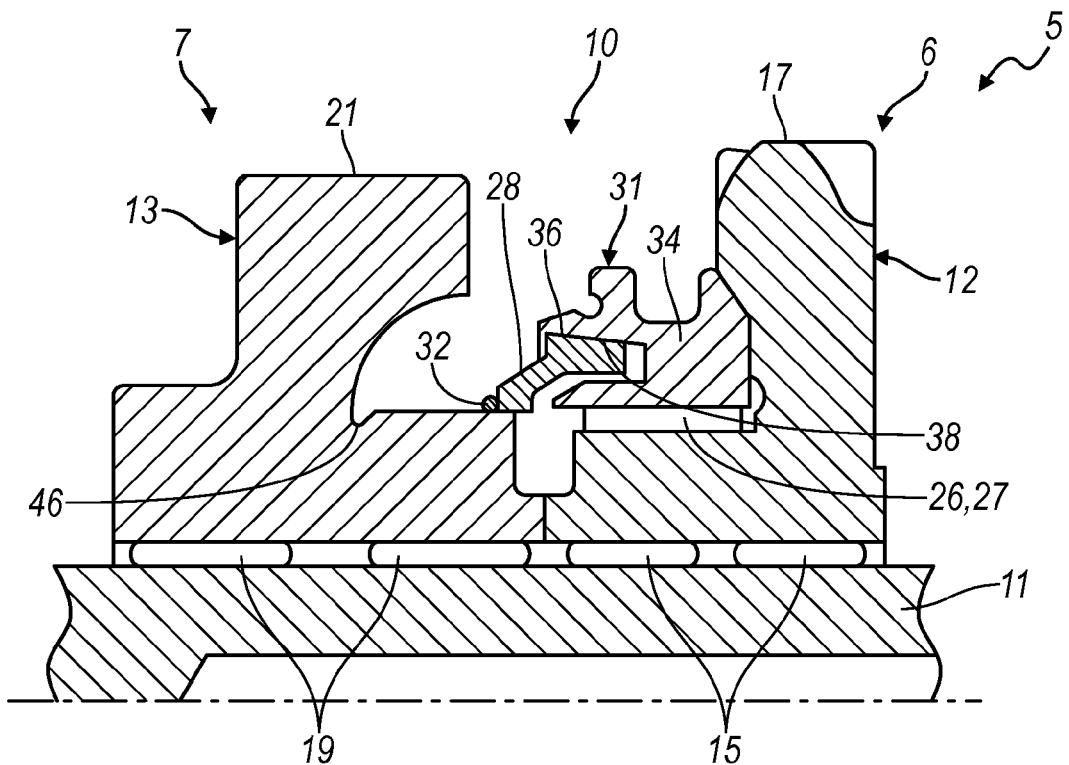
FIG. 1 illustrates a front cross-sectional view of a section of a transmission in accordance with the principles of the present invention, when the transmission is in a neutral position.
Figure 2:
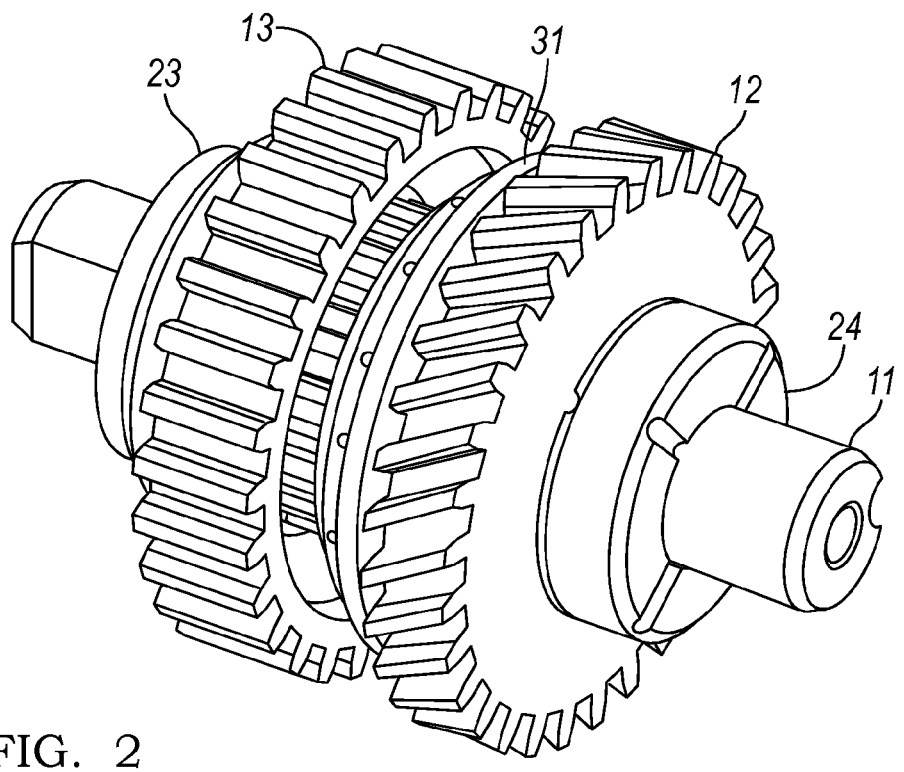
FIG. 2 illustrates a perspective view of the transmission of FIG. 1.

In accordance with the principles of the present invention, FIGS. 1 and 2 show a transmission 5 that includes a first gearwheel assembly 6, a second gearwheel assembly 7, a synchronizer assembly 10, and a shaft 11. The shaft 11 may be provided in the form of a layshaft or an output shaft.

The first gearwheel assembly 6, the second gearwheel assembly 7, and the synchronizer assembly 10 are mounted in a rotatable manner on the shaft 11. The synchronizer assembly 10 is positioned between the first gearwheel assembly 6 and the second gearwheel assembly 7 while the shaft 11 may also be mounted in a rotatable manner in a gearbox or transmission housing.

The gearwheel assembly 6 includes an idler helical gearwheel 12. A set of bearings 15 is disposed between the idler helical gearwheel 12 and the shaft 11 to enable the gearwheel 12 to rotate about the shaft 1. The idler helical gearwheel 12 has a set of gearwheel teeth 17 around its external surface.

Similarly, the gearwheel assembly 7 includes an idler spur gearwheel 13. A set of bearing 19 is disposed between the spur gearwheel 13 and the shaft 11 to enable the spur gearwheel 13 to rotate about the shaft. The spur gearwheel 13 also has a set of gearwheel teeth 21 around its outer surface and a set of splines 22 on its inner surface (see FIGS. 10 and 12). Note that the term "splines" refer to multiple projections or protrusions of one part for fitting into slots of another part.

As shown in FIG. 2, the helical gearwheel 12 and the spur gearwheel 13 are positioned adjacent to each other between a pair of annular thrust members 23 and 24.

Figure 10:
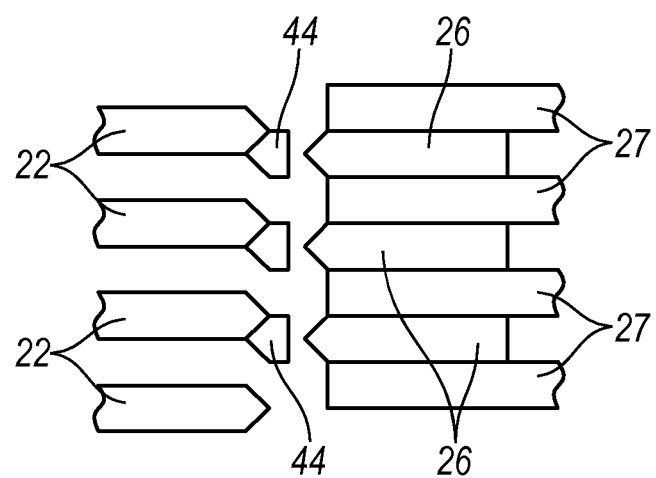
FIG. 10 illustrates a top cross-sectional view of the transmission as shown in FIG. 9.
Figure 12:
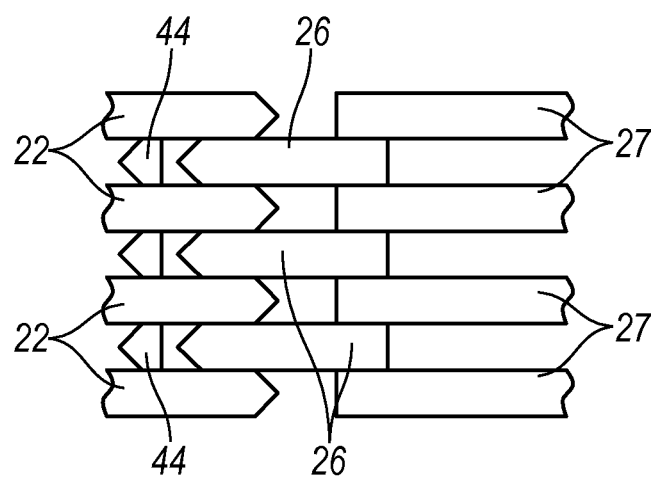
FIG. 12 illustrates a top cross-sectional view of the transmission as shown in FIG. 11.

The synchronizer assembly 10 has a set of inner splines 26 connecting to a set of outer splines 27 of the helical gearwheel 12 such that the synchronizer assembly 10 and the helical gearwheel 12 are able to rotate about the axis of the shaft 11 at the same speed (see FIGS. 1, 10, and 12). These splines 26 and 27 also allow the synchronizer assembly 10 to slide in an axial direction along the shaft 11 such that the synchronizer assembly 10 can slide towards the second gearwheel assembly 7 for engaging the spur gearwheel 13.

Figure 3:
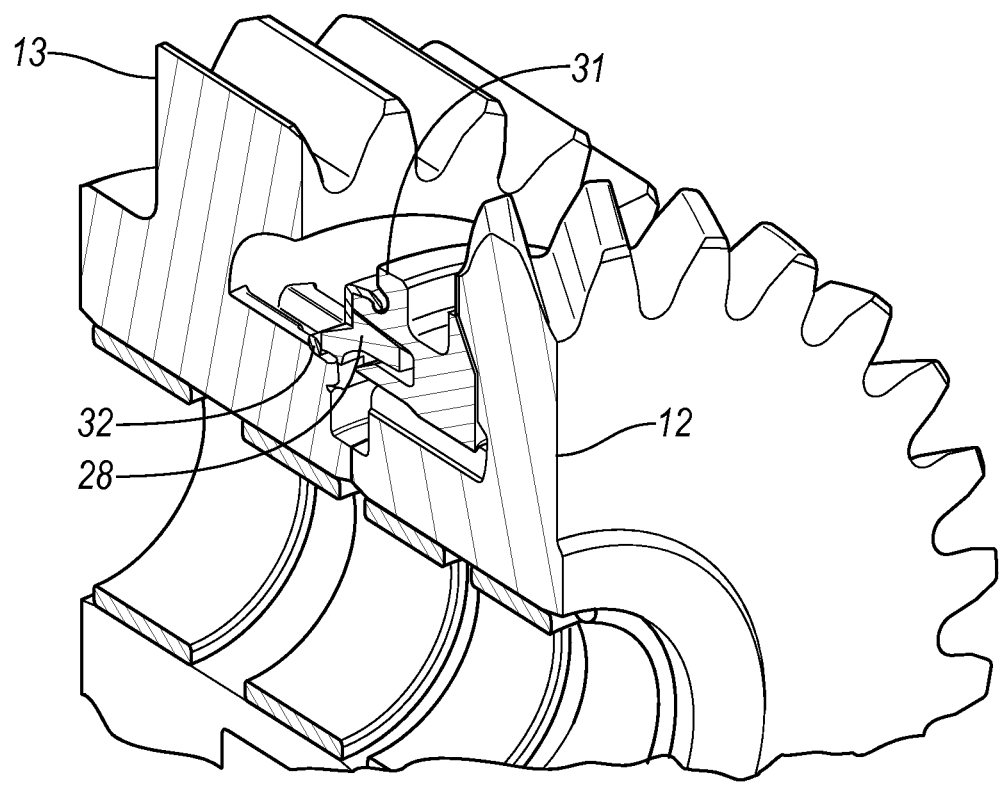
FIG. 3 illustrates a perspective cross-sectional view of the transmission of FIG. 1.
Figure 4:
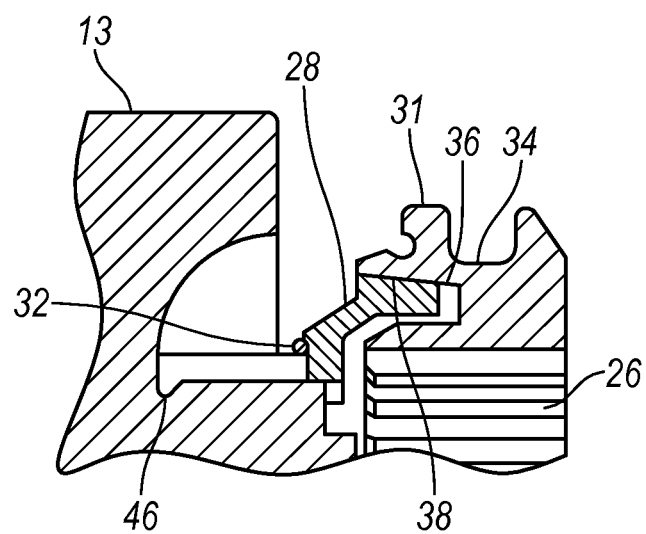
FIG. 4 illustrates an expanded partial view of the transmission of FIG. 1.
Figure 6:
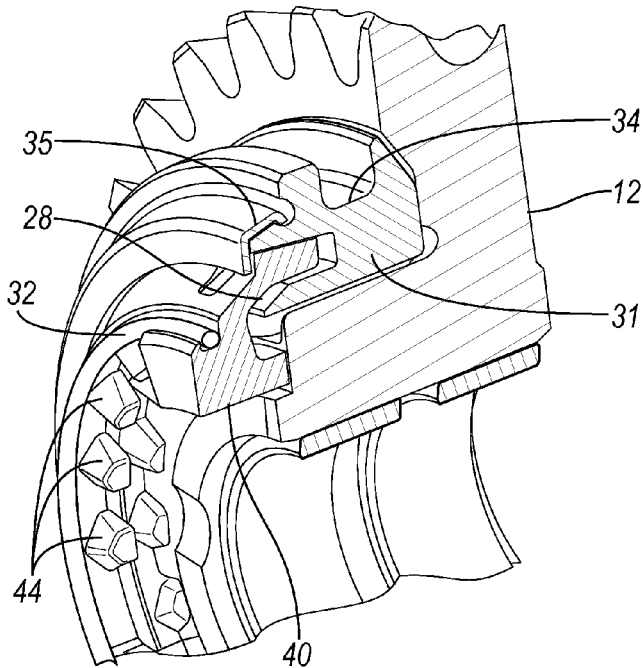
FIG. 6 illustrates a perspective cross-sectional view of the transmission as shown in FIG. 5.

In particular, the synchronizer assembly 10 includes a synchronizer ring 28 and an annular synchronizer sleeve 31, as shown in FIGS. 3 and 4. The synchronizer ring 28 is retained within a recess of the synchronizer sleeve 31 by a retainer 35, as illustrated in FIG. 6.

Referring again to FIG. 1, the synchronizer sleeve 31 has an annular level recess 34 disposed on its outer surface, the splines 26 are disposed on its inner surface, and a frictional inner cone portion 36 is disposed on its inner surface.

The level recess 34 is adapted for receiving one end of a gearshift lever. The splines 26 of the synchronizer sleeve 31 meshes with the splines 27 of the helical gearwheel 12 such that the synchronizer sleeve 31 and the helical gearwheel 12 are rotatable together about the shaft 11 at the same speed. The splines 26 and 27 also allow the synchronizer sleeve 31 to be moveable along the shaft 11 in both axial directions. In the axial direction towards the spur gearwheel 13, the synchronizer sleeve 31 urges or thrusts the synchronizer ring 28 towards the spur gearwheel 13. The cone portion 36 is adapted to engage frictionally with the synchronizer ring 28.

Figure 5:
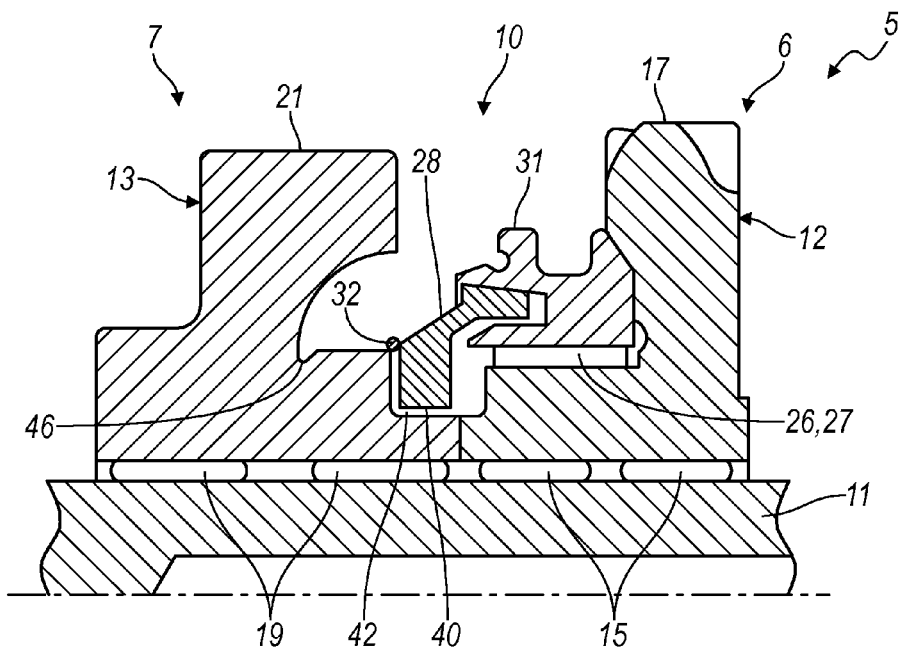
FIG. 5 illustrates a further front cross-sectional view of the transmission of FIG. 1.
Figure 7:
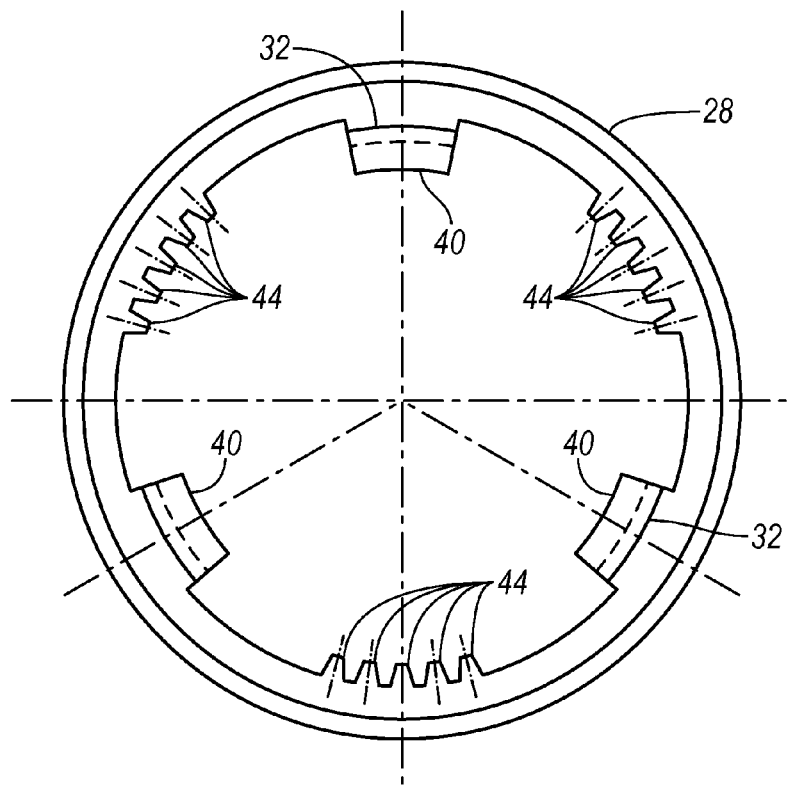
FIG. 7 illustrates a front view of a synchronizer ring of the transmission as shown in FIG. 6.

The synchronizer ring 28 has an external frictional cone portion 38 that is tapered or that is adapted to engage frictionally with the cone portion 36 of the synchronizer sleeve 31. As shown in FIGS. 5 to 7, the synchronizer ring 28 includes a plurality of lugs 40 disposed on an inner surface of the synchronizer ring 28. The lugs 40 are positioned in a set of recesses 42 of the spur gearwheel 13 to engage the spur gearwheel 13 and they protrude towards the spur gearwheel 13. An annular synchronizer spring 32 is retained within an annular recess 33 of this protruding part of the synchronizer ring 28 such that the synchronizer spring 32 is positioned between the synchronizer ring 28 and the spur gearwheel 13, as illustrated in FIG. 6. This placement also allows an early engagement between with the synchronizer spring 32 and the spur gearwheel 13. The synchronizer sleeve 31 also has a set of projections 44 on its inner surface.

The synchronizer sleeve 31 is made mainly of steel, but the synchronizer ring 28 is made of a softer material, such as brass, to reduce wear of the synchronizer sleeve 31, especially during frictionally engagement between the synchronizer sleeve 31 and the synchronizer ring 28.

In use, the gearwheels 12 and 13 together provide a reverse gear or a reverse gearwheel ratio.

The teeth 17 of the helical gearwheel 12 are employed for mechanically engaging and meshing with a fixed gearwheel that is fixed in a rigid manner to an input shaft that receives torque from a combustion engine. Accordingly, the helical gearwheel 12 constantly meshes with the fixed gearwheel of the input shaft. Moreover, the helical gearwheel 12 and the synchronizer assembly 10 rotate together about the about the shaft 11 at the same speed.

Figure 9:
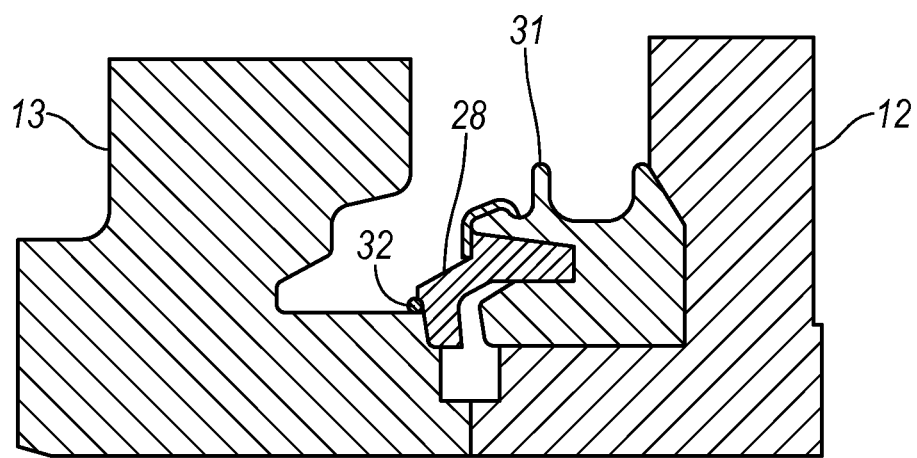
FIG. 9 illustrates a front cross-sectional view of the transmission of FIG. 1 in a first step of engaging an idler gearwheel.
Figure 11:
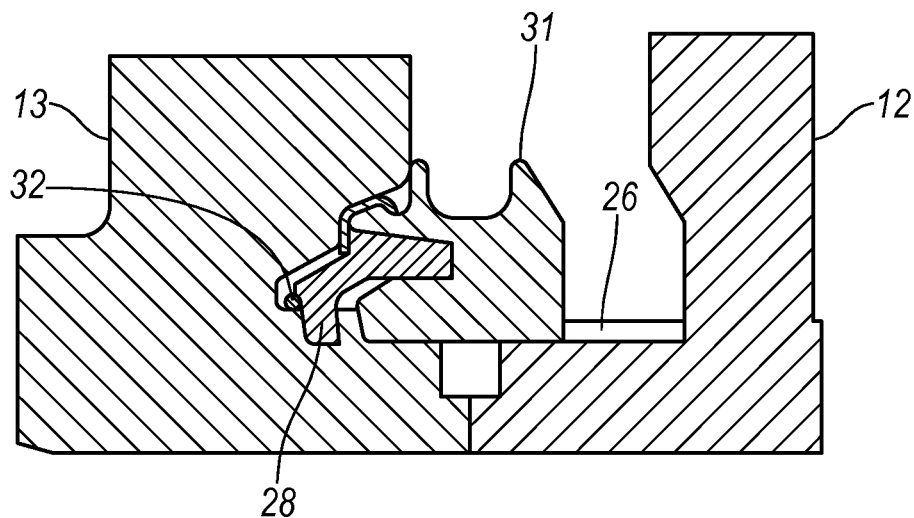
FIG. 11 illustrates a front cross-sectional view of the transmission of FIG. 1 in a second step of engaging the idler gearwheel.

In a neutral or a disengaged state, the splines 22 of the spur gearwheel 13 are disengaged from the splines 26 of the synchronizer assembly 10, and the spur gearwheel 13 rotates freely, as illustrated in FIGS. 9 and 10. In contrast, in an engaged state, the splines 22 of the spur gearwheel 13 are engaged with the splines 26 of the synchronizer assembly 10 such that they both rotate about the shaft 11 at the same speed, as illustrated in FIGS. 11 and 12.

The synchronizer assembly 10 is employed for synchronizing the rotational speed between the spur gearwheel 13 and the helical gearwheel 12. Accordingly, the synchronization causes the spur gearwheel 13 and the helical gearwheel 12 to rotate at the same speed. In addition, the synchronizer assembly 10 prevents a coupling or an engaging of the helical gearwheel 12 to the spur gearwheel 13 until the spur gearwheel 13 is rotating at the same speed as the helical gearwheel 12, since a coupling of the helical gearwheel 12 to the selected spur gearwheel 13 when these parts are rotating at different speeds would result in noise being generated and would result in damage to these parts.

Figure 13:
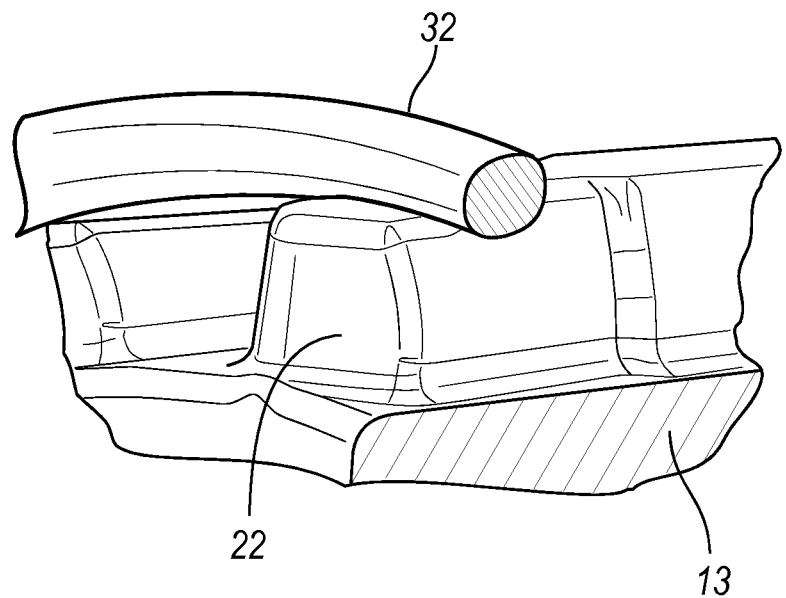
FIG. 13 illustrates a partial view of an engagement of the synchronizer ring of FIG. 7 with teeth of a gearwheel in the first step.
Figure 14:
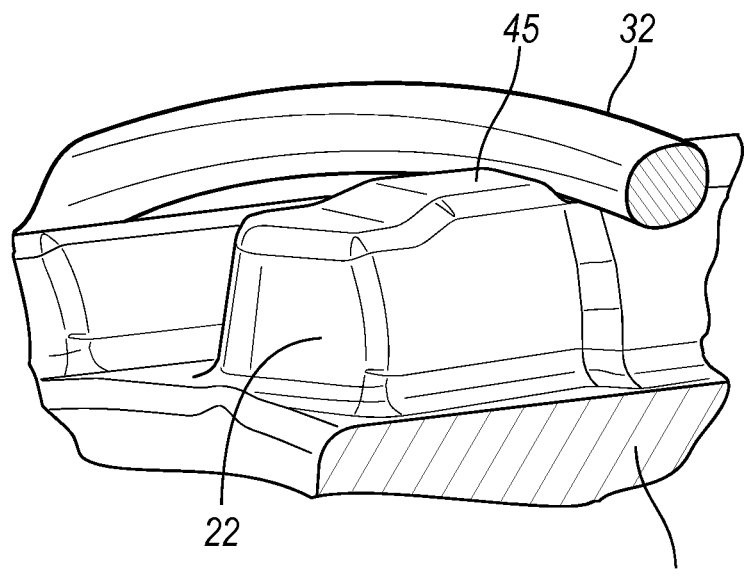
FIG. 14 illustrates a partial view of an engagement of the synchronizer ring of FIG. 7 with teeth of a gearwheel in the second step.

The synchronizer spring 32 abuts against the splines 22 of the spur gearwheel 13 to exert a pre-synchronization force. A set of projections or protrusions 45 of the splines 22 receive the abutment, as illustrated in FIGS. 13 and 14. In a first position, the pre-synchronization force urges the synchronizer ring 28 against the synchronizer sleeve 31 to synchronize the synchronizer ring 28 with the synchronizer sleeve 31. In a second position and after synchronization, the synchronizer spring 32 moves over the protrusions 45, as illustrated in FIG. 14.

Figure 8:
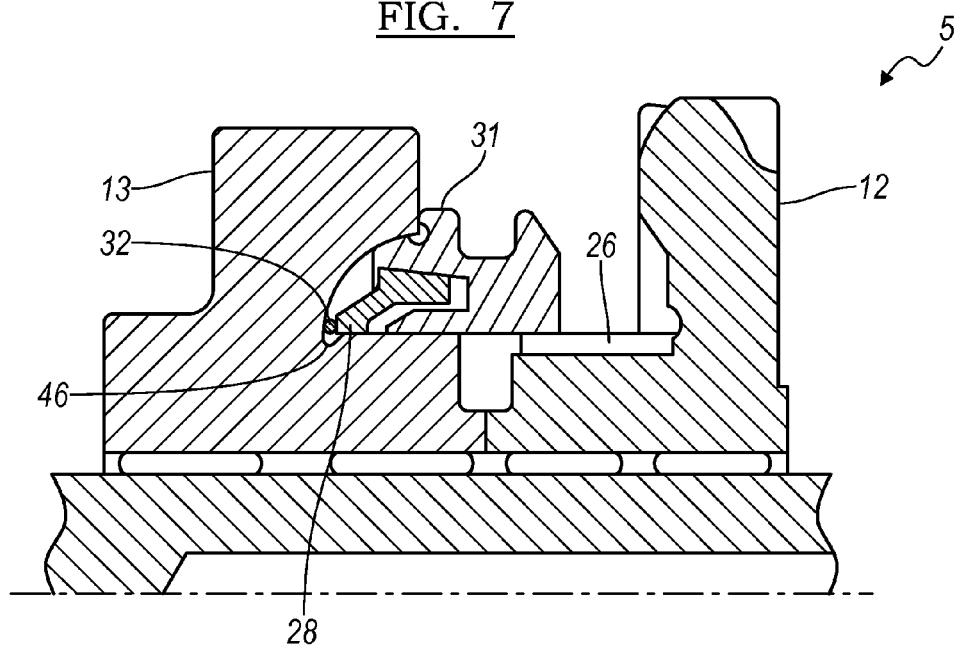
FIG. 8 illustrates a front cross-sectional view of the transmission of FIG. 1, when the transmission is in an engaged position.

A set of spring grooves 46 of the spur gear 13 are used for receiving the synchronizer spring 32, as illustrated in FIG. 8. The spring grooves 46 have an advantage of preventing the synchronizer spring 32 from unwanted movement. They also provide a user with feedback of positive gear engagement.

The cone portion 36 of the synchronizer sleeve 31 and the cone portion 38 of the synchronizer ring 28 act as friction members of a friction clutch for synchronizing the rotational speed of the spur gearwheel 13 to the rotational speed of the shaft 11.

The lugs 40 of the synchronizer ring 28 are used for engaging with the recesses 42 of the spur gearwheel 13 to synchronize the rotational speed between the helical gearwheel 12 and the spur gearwheel 13. In the disengaged state, the synchronizer ring 28 and the spur gearwheel 13 can rotate freely with respect to the helical gearwheel 12. In the engaged state, the lugs 40 engaging the recesses 42 such that the synchronizer ring 28 and the spur gearwheel 13 rotate at the same speed with respect to the helical gearwheel 12.

In a general sense, different types of frictional clutches may also be employed. The friction members may be affixed to the spur gearwheel 13 in different arrangements. A wide range of cone angles may be employed, such as, for example, cone angles of seven and one-half degrees. The friction surfaces or friction members can also include a number of frictional materials affixed to a base member.

One possible method of synchronizing the spur gearwheel 13 is described below. The transmission 5 is in unengaged or neutral state in which the splines 26 of the synchronizer sleeve 31 engage with the splines 27 of the helical gearwheel 12 such that the synchronizer sleeve 31 rotates at the same speed as the helical gearwheel 12, as illustrated in FIGS. 1 and 10.

The method includes a user moving a shift lever of a gear stick to actuate the rotating synchronizer sleeve 31 towards the spur gearwheel 13 in an axial direction of the shaft 11. The gear stick is not shown here.

The synchronizer sleeve 31 then abuts against the synchronizer ring 28 to push or urge the synchronizer ring 28 towards the spur gearwheel 13. This then causes the synchronizer spring 32 to push smoothly against the protrusions 45 of the splines 22 of the spur gearwheel 13 to exert a pre-synchronization force, as illustrated in FIGS. 9, 10, and 13.

The pre-synchronization force urges the synchronizer ring 28 against the synchronizer sleeve 31. The cone portion 36 of the synchronizer sleeve 31 then forcedly engages against the cone portion 38 of the synchronizer ring 28 as a mating or engaging member. This frictional engagement forces the synchronizer ring 28 to rotate at the same speed as the engaging synchronizer sleeve 31, which rotates at the same speed as the helical gearwheel 12.

The lugs 40 of the synchronizer ring 28, which are provided in the recesses 42 of the spur gearwheel 13, rotate the spur gearwheel 13 at the same speed as the synchronizer ring 28, which rotates at a speed, which is slightly lower than the speed of the synchronizer sleeve 31 and of the helical gearwheel 12. The speed of the synchronizer ring 28 depends on the frictional engagement between the synchronizer ring 28 and the synchronizer sleeve 31.

After achieving speed synchronization, the actuation of the synchronizer sleeve 31 then moves the synchronizer spring 32 to go over the protrusions 45 of the splines 22 of the spur gearwheel 13, as illustrated in FIG. 14. The actuation also moves the splines 26 of the synchronizer sleeve 31 to engage with the splines 22 of the spur gearwheel 13 and with the splines 27 of the helical gearwheel 12, as illustrated in FIG. 12.

In this way, the helical gearwheel 12 is interlocked with the spur gearwheel 13 in a synchronized manner without grinding or clashing of gearwheel teeth. The resiliency of the synchronizer spring 32 provides a smooth and quiet action of the synchronizer assembly.

For disengaging the spur gearwheel 13 from the helical gearwheel 12, the user may move the synchronizer sleeve 31 away from the spur gearwheel 13 using the shift lever of the gear stick. Moving the synchronizer sleeve 31 also pulls the synchronizer ring 28, which is retained by the retainer 35, away from the spur gearwheel 13. The synchronizer ring 28, in turn, pulls the synchronizer spring 32 away from the spur gearwheel 13. This pulling urges the synchronizer spring 32 out of the groove 46.

The description of the invention is merely exemplary in nature and variations that do not depart from the gist of the invention are intended to be within the scope of the invention. Such variations are not to be regarded as a departure from the spirit and scope of the invention.

What is claimed is:

1. A synchronizer assembly for a transmission in a motor vehicle powertrain, the synchronizer assembly comprising:
    a synchronizer sleeve that engages a first gearwheel of the transmission, the synchronizer sleeve and the first gearwheel being rotatable about a shaft and the synchronizer sleeve being axially moveable along the shaft; and
    a synchronizer ring that selectively engages the synchronizer sleeve, the synchronizer ring including
    a synchronizer spring,
    a second gearwheel of the transmission, the second gearwheel including a plurality of splines with projections, the synchronizer spring having a first position that abuts against the projections to exert a pre-synchronization force that pushes the synchronizer ring against the synchronizer sleeve to synchronize the synchronizer ring with the synchronizer sleeve and a second position in which the synchronizer spring moves over the projections after synchronization, and
    a plurality of lugs that engage the second gearwheel to synchronize the rotation of the first gearwheel to the second gearwheel, and
wherein the synchronizer spring is retained on the plurality of lugs.

2. The synchronizer assembly of claim 1, wherein the synchronizer ring includes a recess that retains the synchronizer spring.

3. The synchronizer assembly of claim 2, wherein the plurality of lugs includes the recess that retains the synchronizer spring.

4. The synchronizer assembly of claim 1, wherein the plurality of lugs includes three lugs.

5. The synchronizer assembly of claim 1, wherein the synchronizer spring is an annular spring element.

6. The synchronizer assembly of claim 1 further comprising a retainer that retains the synchronizer ring and the synchronizer sleeve together.

7. The synchronizer assembly of claim 6, wherein the synchronizer ring is retained in a recess of the synchronizer sleeve.

8. A shifting mechanism for a transmission, the shifting mechanism comprising:
   a synchronizer assembly with a synchronizer sleeve;
   a first gearwheel with a first plurality of splines that engage with the synchronizer sleeve of the synchronizer assembly;
   a synchronizer ring that selectively engages the synchronizer sleeve;
   a synchronizer spring; and
   a second gearwheel that includes a second plurality of splines that selectively interlocks with the plurality of splines of the first gearwheel through the synchronizer sleeve, the plurality of splines including projections, the synchronizer spring having a first position that abuts against the projections to exert a pre-synchronization force that pushes the synchronizer ring against the synchronizer sleeve to synchronize the synchronizer ring with the synchronizer sleeve and a second position in which the synchronizer spring moves over the projections after synchronization.

9. The shifting mechanism of claim 8, wherein the second gearwheel includes a retainer groove that selectively retains the synchronizer spring.

10. The shifting mechanism of claim 8, wherein the synchronizer spring selectively abuts the second gearwheel to push the synchronizer ring against the synchronizer sleeve.

11. The shifting mechanism of claim 10, wherein the synchronizer ring includes a plurality of lugs that engage the second gearwheel.

12. The shifting mechanism of claim 8, wherein the synchronizer assembly includes a retainer that retains the synchronizer ring and the synchronizer sleeve together.

13. The shifting mechanism of claim 12, wherein the synchronizer ring is retained in a recess of the synchronizer sleeve.

14. The shifting mechanism of claim 8, wherein the synchronizer spring is an annular spring element.

* * * * *